P. MUELLER.
ADJUSTABLE SCREW JOINT COUPLING FOR SUPPLY PIPES.
APPLICATION FILED MAR. 24, 1911.
1,039,575. Patented Sept. 24, 1912.
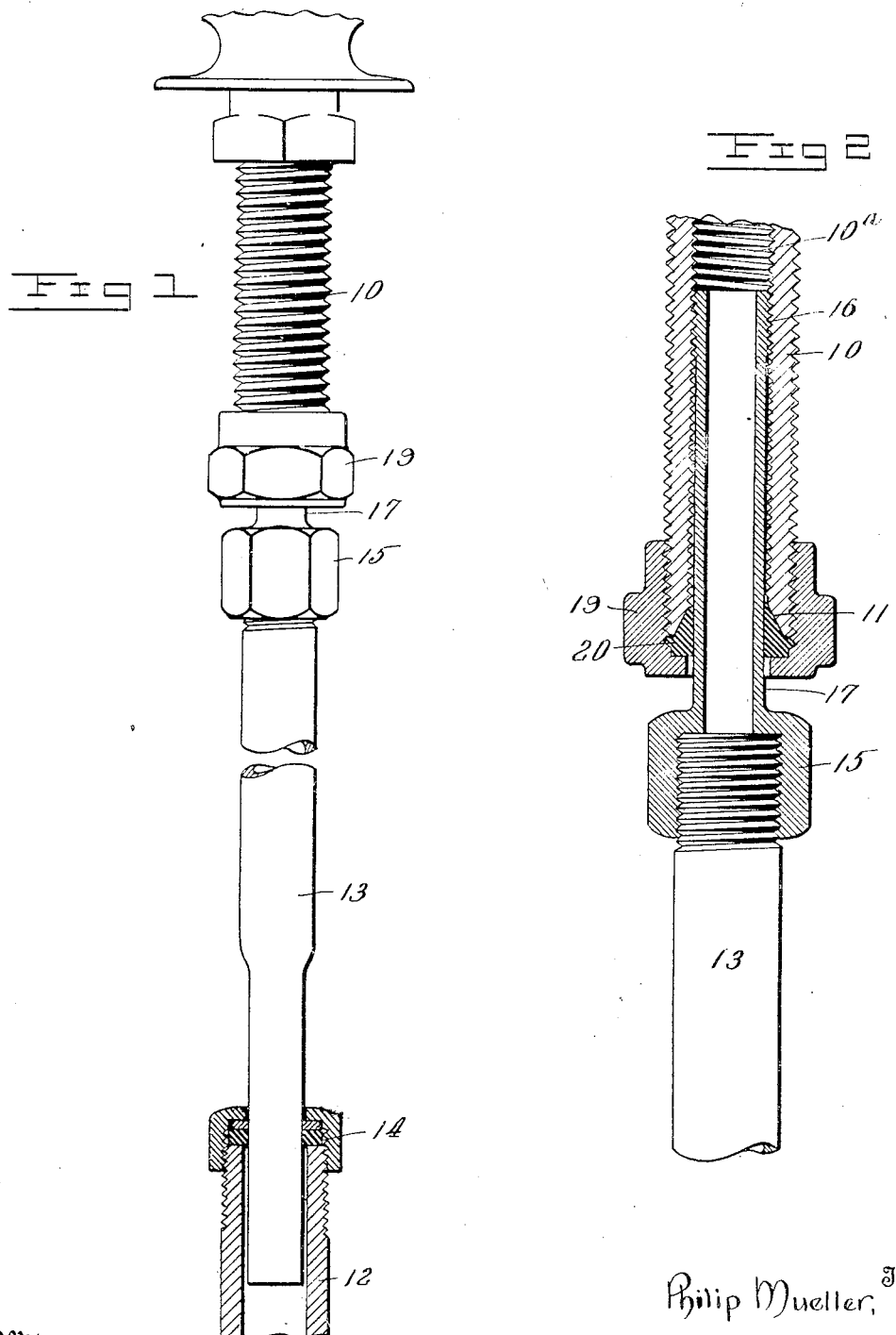
Inventor
Philip Mueller,
By Meyers, Cushman & Rea
Attorneys
Witnesses

ABSENT# UNITED STATES PATENT OFFICE.

PHILIP MUELLER, OF DECATUR, ILLINOIS, ASSIGNOR TO H. MUELLER MANUFACTURING COMPANY, OF DECATUR, ILLINOIS, A CORPORATION OF ILLINOIS.

ADJUSTABLE SCREW-JOINT COUPLING FOR SUPPLY-PIPES.

1,039,575.

Specification of Letters Patent. Patented Sept. 24, 1912.

Application filed March 24, 1911. Serial No. 616,694.

*To all whom it may concern:*

Be it known that I, PHILIP MUELLER, a citizen of the United States, residing at Decatur, in the county of Macon and State of Illinois, have invented new and useful Improvements in Adjustable Screw - Joint Couplings for Supply-Pipes, of which the following is a specification.

This invention relates to coupling pipes such as are employed in making connection between service pipes and the faucets of bath tubs, wash basins, and the like, this connection forming what is now generally known in the art as the supply pipe, and relates more particularly to the manner in which this pipe is coupled up to the part or parts to which it is connected.

In order to permit the use of coupling pipes or the supply pipe in standard sizes as to length and diameter, especially for open plumbing work, it is found advisable to provide adjustable connections between the supply pipe and either one or both of the parts to which it is connected, this being due to the fact that the distance between the service pipe and the faucet shank, spud, or tail-piece as the case may be, varies in installation. As the supply pipe, in open plumbing work, is visible throughout substantially its length, its appearance has more or less effect upon the beauty of the plumbing, and consequently the supply pipe should be, as far as possible, symmetrical in appearance with the remaining portions of the fixtures. In view of the fact that this symmetrical appearance must be provided in the face of conditions produced by the liquid pressure, several essentials are necessary.

One of the essentials required is that the coupling shall not be liable to blow-outs, and yet at the same time provide a structure in which the internal diameter of the supply should be of sufficient size for all practical purposes while the outer diameter is such as will not provide a bulky appearance. To meet these conditions, it has been proposed to employ a slip-joint connection with the end of the supply pipe telescoping into the fitting member, the supply pipe preferably having a flange against which the coupling nut may operate to retain the connection, a packing being employed in connection with this flange. This construction, owing to the liability of blow-outs under high liquid pressure, is not entirely satisfactory, one reason being that it is difficult to provide a proper manipulation of the packing so as to insure a non-leakage of liquid.

Another feature greatly desired in supply pipes, is to provide for variations in the distance between the service pipe and the faucet or lavatory member by the use of a standard length supply pipe, making the connections such as to eliminate all liability of blow-outs, one way of meeting this latter condition being to provide for a sufficient adjustment at the ends of the supply pipe to produce the proper exposed length of the pipe and yet provide a sufficient length of unexposed portion within the coupling as will make the latter practically blow-out proof. And a preferable form of device is to provide for connecting the supply and service pipes by a slip-joint, and providing for screw threaded adjustments in the connections at the opposite end of the supply pipe. To provide this arrangement I obtain the combined effect of the use of both screw threaded and slip-joint connections, obtaining the advantages of both and in addition eliminating all of the disadvantages of both. In obtaining this result I provide for compressing the packing onto a smooth face of the coupling.

The object of my invention is, therefore, to provide a coupling pipe and connections capable of providing the essentials referred to, and the invention consists in the improved construction and combination of parts hereinafter fully described, illustrated in the accompanying drawings, and particularly pointed out in the appended claims.

In the drawings, in which similar reference characters indicate similar parts in each of the views,—Figure 1 is a view partly in elevation and partly in section of a preferred form of coupling pipe mounted in position. Fig. 2 is an enlarged longitudinal sectional view taken through the connection at the upper end of the pipe.

In the drawings, 10 designates a faucet shank exteriorly threaded and preferably having the interior of its end flared, as at 11. This shank is illustrative only for the purpose of describing the invention, it being understood that the part represented by the shank may be a portion of any type of fitting, such as the shank of a bath or basin cock, the tail-piece of a lavatory member, etc., the invention being applicable for use in connection with any of the well known types of fittings.

12 designates the service pipe, and 13 the coupling or supply pipe, the latter preferably being formed with a reduced lower end and connected to the service pipe by a slip-joint 14 of any preferred type. It is to be understood, however, that I do not limit the invention to this particular formation of the lower end of the pipe or the form of coupling, since it will be obvious that the supply pipe may have its lower end of equal diameter with the body of the pipe and that any suitable and preferred form of connection may be made between the supply and service pipes.

The principal feature of my invention is the manner in which the supply pipe is coupled to the shank 10, and a preferred form is shown in the drawings and will now be described.

15 designates a member preferably screw threaded to the upper end of the supply pipe 13 and forms an adjustable extension for said pipe, said member preferably being formed with a wrench-hold and being of reduced diameter externally in advance of the wrench-hold. The reduced portion of the member 15 has its external length divided into screw threaded and smooth portions, the smooth portion, indicated as 17, being adjacent to the wrench-hold, while the screw threaded portion, indicated as 16, extends from the end of the smooth portion preferably to the advanced end of the member. As shown in Fig. 2, the external diameter of the smooth portion is less than the similar diameter of the threaded portion, this arrangement providing for but a limited threaded surface of the member and at the same time produce a structure of sufficient length to provide for a considerable amount of adjustment.

To coöperate with the threaded end 16, I form the shank 10 internally threaded, as at 10ª, the threads leading inwardly from the end of the inner flared portion 11, so that when the member 15 is threaded into the shank the entire length of the threaded end 16, there will be a smooth face of the member within the shank and on to which a suitable gasket 20 may be compressed by a cap or nut 19 adapted to be threaded on to the exterior of the shank and having an opening through which the member 15 is adapted to pass, said cap co-acting with the flared end of the shank to compress the gasket on to the smooth portion 17 to form a liquid tight joint and at the same time act as a supporting element for the member 15 at a point spaced from the point of connection of the threaded end 16 with the shank, thereby eliminating liability of springing the member 15 and effecting the threaded connection on the threads 10ª of the shank.

As will be seen, the relative arrangement of parts just described is such as to provide adjustment for variations in distance between the inlet end of the shank 10 and the outlet end of the service pipe 12. The threaded connection of the cap or nut 19 and the shank provides no adjustment in this respect, serving mainly as a compressing member for the gasket. The actual adjustment is provided by the threaded connection of the end 16 with the threads 10ª, and the threaded connection between the pipe 13 and member 15, the latter connection acting as auxiliary to the main adjustment provided between the member 15 and shank 10.

As will be seen, the threaded end 16 has a considerable range of movement within the shank, and the arrangement of parts is such that there is at all times a smooth portion 17 in position to receive the gasket 20 preferably of soft metal when the gasket is compressed. This range of movement is sufficient to provide for substantially all service conditions, affording all necessary adjustments for the purpose of completing the connection in a proper manner with a sufficient length of supply pipe positioned within the members to which it is connected to eliminate all liability of blow-outs. By this particular arrangement of parts the external threads of the supply pipe 13 need not be of as great a depth as those of the shank, thereby enabling the use of a supply pipe of medium wall thickness without restricting the liquid flow or providing a bulky appearance to the pipe.

While I have herein disclosed a preferred form and modifications thereof, it is to be understood that changes and modifications therein required under the conditions of use may be employed and are contemplated by the invention herein so long as they fall within the spirit and scope of the invention as disclosed in the following claims.

Having thus described my invention, what I claim as new is:—

1. The combination with a faucet shank having external and internal threads extending from its extremity inward, and a service pipe, of a supply pipe adjustably fitting in one end of the service pipe and having threads at its opposite end, an extension member threaded upon the threaded end of the supply pipe and having a reduced portion with a threaded extremity engaging adjustably in the threaded faucet shank, a gasket fitting about the reduced portion and against the extremity of the faucet shank, and a cap engaging over the extremity of the faucet shank and about the reduced portion to bind the gasket against the reduced portion and the shank.

2. In combination with a supply pipe and a shank interiorly and exteriorly threaded from its extremity inward, an extension member on the supply pipe and having a reduced and smooth portion and provided at the end of the smooth portion with threads for adjustable engagement within the shank, a packing gasket encircling the smooth portion, and a cap adjustable on the extremity of the shank and about the reduced smooth portion and engaging the gasket to bind the same against the extremity of the shank and about the smooth portion of the extension.

3. In combination, a supply pipe, a shank, and means for positively connecting said parts adjustably, said means including a reduced extension threaded on the supply pipe and engaging within the shank in threaded relation adjustably throughout the length of the shank.

4. In combination, a supply pipe having a threaded end, an interiorly and exteriorly threaded shank having the inner wall thereof flared at its extremity, and means for connecting said parts adjustably, said means including an extension threaded upon the supply pipe and having a reduced smooth portion and a portion therebeyond with threads engaging in threaded relation within the shank and adapted for adjustment throughout the entire length of the same, a gasket carried about the smooth portion of the extension, and a cap fitting about the smooth portion of the extension over the gasket and engaging in threaded relation over the extremity of the shank, said cap being adapted to compress the gasket into the flared extremity of the shank and against the smooth portion of the extension.

5. As a new article of manufacture a supply pipe comprising an elongated portion, a reduced extension mounted on the elongated portion and having a smooth exterior face throughout nearly its length and an externally threaded and slightly enlarged outer end adapted to extend into an internally threaded faucet spud and engaging with the threads of the same, a packing carried about the smooth surface of the extension, and a packing nut engaging over the end of the spud and about the smooth surface of the extension adapted to compress the packing against the spud and against the smooth exterior surface of the extension.

6. In combination, a supply pipe, a shank, and means for positively connecting said parts adjustably, said means including a reduced extension for the supply pipe engaging within the shank in threaded relation adjustably throughout the length of the shank.

In testimony whereof I have hereunto set my hand in presence of two subscribing witnesses.

PHILIP MUELLER.

Witnesses:
 LEONARD F. MCKIBBEN,
 WILLIAM R. BIDDLE.